United States Patent
Smith (12) 
(10) Patent No.: US 6,545,839 B2
(45) Date of Patent: Apr. 8, 2003

(54) ERGONOMIC SAFETY MECHANISM FOR HANDLING MICRO-SIZED COMPUTER HARD DISK DRIVES

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/054,586

(22) Filed: Jan. 22, 2002

(65) Prior Publication Data

US 2002/0067568 A1 Jun. 6, 2002

Related U.S. Application Data

(62) Division of application No. 09/487,909, filed on Jan. 19, 2000, now Pat. No. 6,437,939.

(51) Int. Cl.[7] .............................................. G11B 31/00
(52) U.S. Cl. .................................... 360/97.01; 361/685
(58) Field of Search ........................... 360/97.01, 99.01, 360/137; 369/75.1, 77.1, 292; 361/683, 684, 685; 708/140; 312/223.2, 223.1; 248/682; 174/50; D14/369

(56) References Cited

U.S. PATENT DOCUMENTS

| | | |
|---|---|---|
| 4,707,821 A | 11/1987 | Verhagen |
| 4,736,356 A | 4/1988 | Konshak |
| 4,937,806 A | 6/1990 | Babson et al. |
| 4,941,841 A | 7/1990 | Darden et al. |
| 5,282,100 A | 1/1994 | Tacklind et al. |
| 5,291,355 A | 3/1994 | Hatch et al. |
| 5,587,854 A | 12/1996 | Sato et al. |
| 5,615,197 A | 3/1997 | Choi |
| D383,736 S * | 9/1997 | Corrington et al. ........ D14/367 |
| 5,850,630 A | 12/1998 | Wilson |
| 5,862,015 A | 1/1999 | Evans et al. |
| 5,872,669 A | 2/1999 | Morehouse et al. |
| 5,999,356 A | 12/1999 | Dimitri et al. |
| 6,163,450 A * | 12/2000 | Kim ............................ 174/50 |
| 6,325,353 B1 * | 12/2001 | Jiang ......................... 248/682 |
| 6,388,875 B1 * | 5/2002 | Chen ...................... 312/223.1 |
| 6,407,913 B1 * | 6/2002 | Peachey et al. .......... 312/223.2 |

* cited by examiner

*Primary Examiner*—Brian E Miller
*Assistant Examiner*—Tianjie Chen
(74) *Attorney, Agent, or Firm*—Bracewell & Patterson LLP (57) ABSTRACT

A hard disk microdrive is equipped with an ergonomic assist mechanism for safe handling of the microdrive while removing it from a system. The mechanism is located on one end of the microdrive, opposite the system connector. In one version, the mechanism is a flat, two-piece design having a slide extending through a slot in a strap. One end of each of the slide and strap is mounted to the microdrive and their other ends are unattached and free to move relative to each other and the microdrive. When the microdrive is to be removed from the system, the user grasps the free end of the slide and lifts it away from the microdrive. As the user continues to pull on the slide, the slot in the strap allows the slide to move to the middle of the microdrive, thereby lifting the strap in the process. The force provided by the user is centralized on the microdrive for a smooth, safe extraction from the system while the connectors disengage. Since the user maintains a grip on the mechanism at all times, the risk of mishandling and dropping the microdrive is minimized. After the microdrive is removed from the system, the mechanism collapses to a flat, stowed position against the microdrive.

5 Claims, 5 Drawing Sheets

ERGONOMIC SAFETY MECHANISM FOR HANDLING MICRO-SIZED COMPUTER HARD DISK DRIVES

Divisional of prior application Ser. No. 09/487,909 filed on Jan. 19, 2000 now U.S. Pat. No. 6,437,939.

BACKGROUND OF THE INVENTION

1. Technical Field

This invention relates in general to an improved computer hard disk drive, and in particular to a mechanism for improving the handling of micro-sized hard disk drives. Still more particularly, the invention relates to an ergonomically designed mechanism for assisting and improving the safe handling of micro-sized hard disk drives during removal from their host system.

2. Description of the Prior Art

Generally, a digital data access and storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

Micro-sized hard disk drives or "microdrives" are the smallest and lightest disk drives available in an industry standard form factor. A microdrive is generally rectangular in shape and has external dimensions of only 42.8×36.4×5.0 $mm^3$, which is less than half the size of a standard business card. Moreover, microdrives typically weigh on the order of half an ounce. With such a small size, the internal components of the disk drive are sensitive to physical handling. Users of microdrives must be especially careful when inserting or ejecting them from a host system such as a digital camera. Upon ejection, a lightweight microdrive may be inadvertently launched from its host system such that it is mishandled, dropped and damaged. At present, most host systems that utilize microdrives are equipped with automated ejection mechanisms that increase the risk of damage to the microdrives. Thus, a need exists to develop a system and method for safely removing microdrives from their host systems and minimizing the risk of damage to the microdrives as they are handled. removing microdrives from their host systems and minimizing the risk of damage to the microdrives as they are handled.

SUMMARY OF THE INVENTION

A miniature hard disk drive or "microdrive" is equipped with an ergonomic assist mechanism for safe handling of the microdrive while removing it from a host system. The mechanism is located on one end of the microdrive, opposite its host system connector. In one version, the mechanism is a flat, two-piece design having a slide extending through a slot in a strap. One end of each of the slide and strap is mounted to the microdrive and their other ends are unattached and free to move relative to each other and the microdrive.

When the microdrive is to be removed from the host system, the user grasps the free end of the slide and lifts it away from the microdrive. As the user continues to pull on the slide, the slot in the strap allows the slide to move to the middle of the microdrive, thereby lifting the strap in the process. The force provided by the user is centralized on the microdrive for a smooth, safe extraction from the host system while the connectors disengage. Since the user maintains a grip on the mechanism at all times, the risk of mishandling and dropping the microdrive is minimized. After the microdrive is removed from the host system, the mechanism collapses to a flat, stowed position against the microdrive when the user releases it.

Accordingly, it is an object of the invention is to provide an improved computer hard disk drive.

It is an additional object of the invention is to provide a mechanism for improving the handling of micro-sized hard disk drives.

Still another object of the invention is to provide an ergonomically designed mechanism for assisting and improving the safe handling of micro-sized hard disk drives during removal from their host system.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PREFERRED EMBODIMENT

Figure 1:
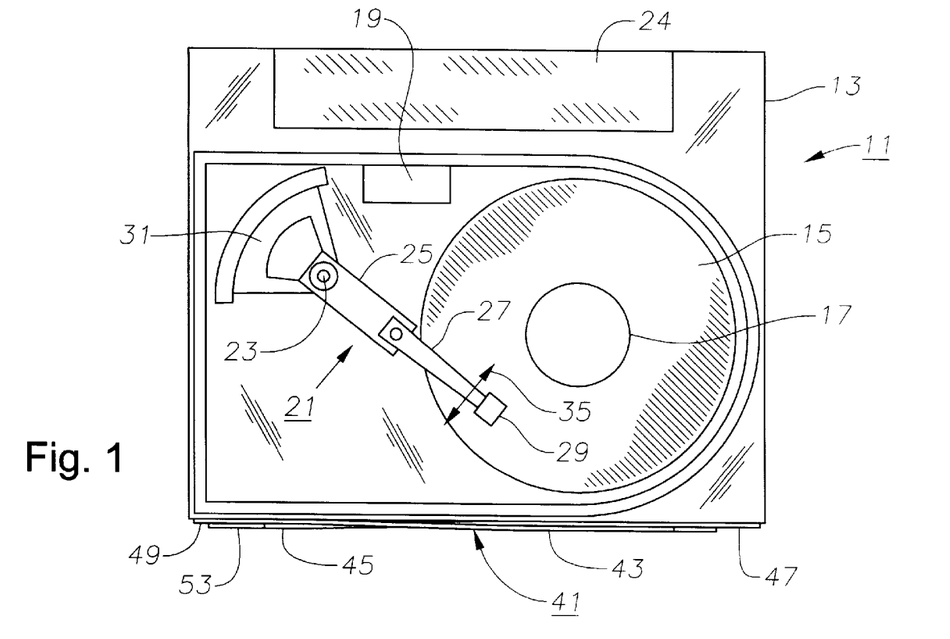
FIG. 1 is an enlarged plan view of a micro-sized computer hard disk drive shown uncovered, and having a first embodiment of a release mechanism constructed in accordance with the invention on one end surface.

Referring to FIG. 1, an enlarged schematic drawing of an information storage system comprising a miniature magnetic hard disk file or microdrive 11 for a computerized host system is shown. Microdrive 11 has a generally flat rectangular shape with external dimensions of approximately 42.8×36.4×5.0 mm$^3$. Microdrive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15. Microdrive II also has an electrical connector 24 on one end for interconnection with a host system.

In the embodiment shown, each arm 21 comprises a EMU mounting support 25, a pair of parallel, cantilevered load beams or suspensions 27 extending from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Motor assembly 31 moves head gimbal assemblies 29 radially across tracks on the disks 15 (indicated by arrow 35) until the heads on assemblies 29 settle on the target tracks.

Figure 2:
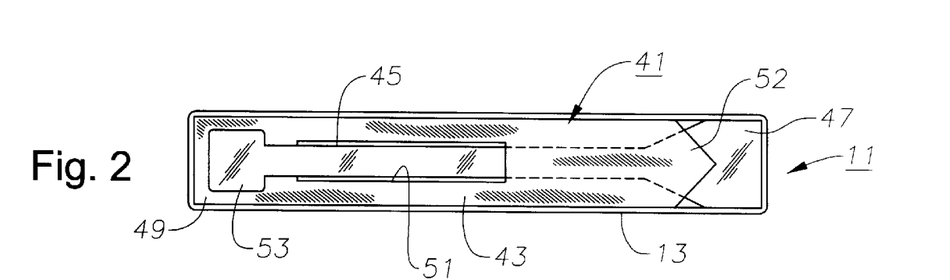
FIG. 2 is an end view of the disk drive and release mechanism of FIG. 1.

Referring now to FIGS. 1 and 2, microdrive 11 is equipped with a first embodiment of an ergonomic assist 41 for safe handling while removing microdrive 11 from its host system. Mechanism 41 is located on one end of microdrive 11, opposite connector 24 (FIG. 1). Mechanism 41 substantially covers one of the 42.8×5.0 mm ends of base 13. In this first embodiment, mechanism 41 is a two-piece design having a narrow, elongated strap 43 and a slide 45. In FIG. 2, the right end 47 of slide 45 is mounted to base 13, and the left end 49 of strap 43 is mounted to base 13. Ends 47, 49 are adhesively bonded or otherwise permanently attached to microdrive 11. The right and left ends 52, 53 of strap 43 and slide 45, respectively, are unattached and free to move relative to each other and base 13. In the embodiment shown, strap 43 has a flat rectangular profile with a rectangular groove or slot 51 formed near its center portion. The flat, narrow, rectangular slide 45 extends through slot 51 and has a T-shaped head 53 on its left end.

Strap 43 and slide 45 are preferably formed from a low cost plastic material with sufficient elasticity, stiffness, and strength to return mechanism 41 to a "stowed" position (substantially flush with the end of microdrive 11) when it is not in use. There are many plastic materials that can be used including polyethylene, nylon, and other plastics. The essential function of mechanism 41 is an expandable band. By using sliding motion rather than purely elastic member, material properties are better optimized for elasticity, strength, color, hardness, cost, stiffness, and roughness (for improved grip).

Figure 3:
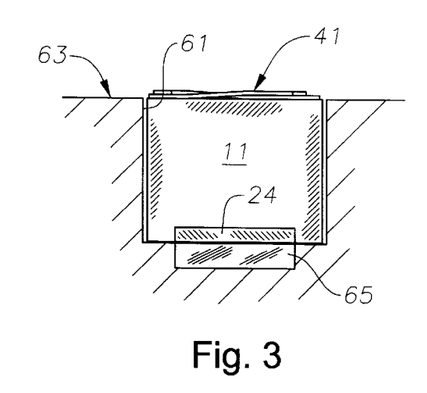
FIG. 3 is a schematic side view of the disk drive of FIG. 1 installed in a host system.

In operation (FIG. 3), microdrive 11 is installed in a drive receptacle 61 in a host system 63, such as a digital camera, for interaction therewith. An electrical connector 65 is located at the base of receptacle 61 and interconnected to connector 24 on microdrive 11. When not in use, mechanism 41 lies nearly flush with the exterior of microdrive 11 and host system 63 to maintain the form factor of microdrive 11 and a clean profile for host system 63.

Figure 4:
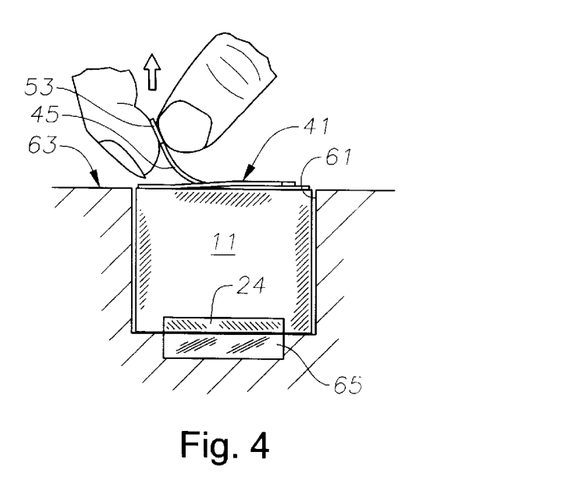
FIG. 4 is a schematic side view of the disk drive and host system of FIG. 3 shown with the disk drive at an initial stage of removal.
Figure 5:
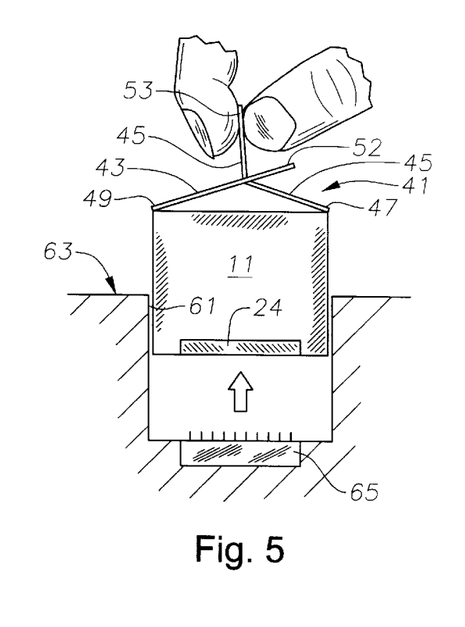
FIG. 5 is a schematic side view of the disk drive and host system of FIG. 3 shown with the disk drive at an advanced stage of removal.
Figure 6:
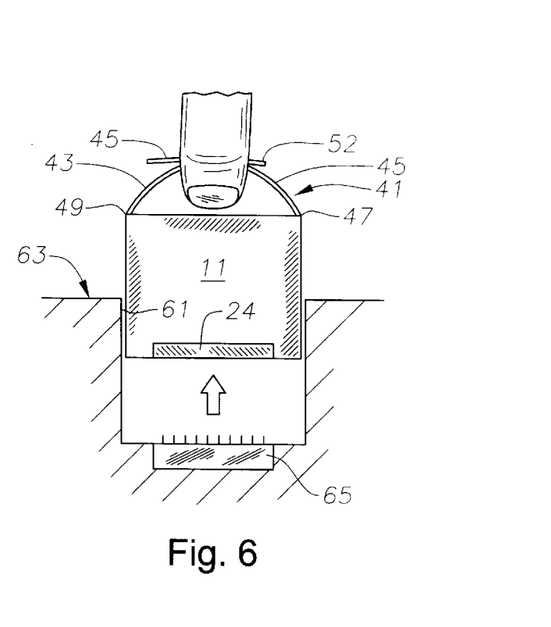
FIG. 6 is a schematic side view of the disk drive and host system of FIG. 5 at the advanced stage of removal and illustrating an alternate grip position on the disk drive.

When microdrive 11 is to be removed from host system 63 (FIG. 4), the user grasps head 53 of mechanism 41 and lifts or extends slide 45 away from host system 63 to an extended position. This step may be coordinated with the actuation of an ejection button (not shown) on host system 63 if it is so equipped. As the user continues to pull on slide 45 (upward in FIG. 5), slot 51 in strap 43 allows slide 45 to move to and substantially align with the middle of microdrive 11, thereby lifting strap 43 in the process. This configuration allows the force provided by the user to be centralized between ends 47, 49 as a symmetric force on microdrive 11 for a smooth, safe extraction from host system 63, while connectors 24, 65 simultaneously disengage one another. Alternatively, connectors 24, 65 may be disengaged by the ejection button with the actual removal of microdrive 11 from host system 63 performed manually by the user. FIG. 6 illustrates an alternate grip position on mechanism 41 wherein the user may extend his or her fingers through the opening between microdrive 11 and mechanism 41. Since the user maintains a grip on mechanism 41 at all times, the risk of mishandling and dropping microdrive 11 is minimized compared to prior art removal systems and methods. After microdrive 11 is removed from host system 63, the properties and design of mechanism 41 allows it to automatically collapse back to its stowed position (FIGS. 1 and 2) when the user releases it.

Figure 7:
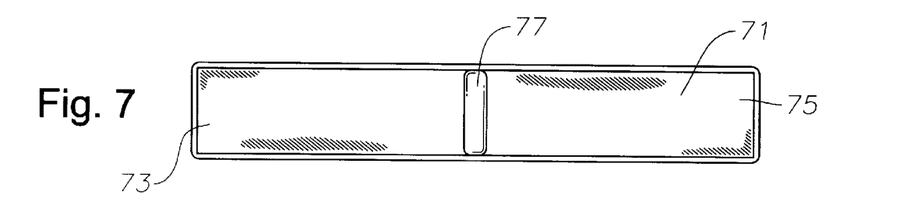
FIG. 7 is a schematic end view of a second embodiment of the release mechanism of FIG. 2 on the disk drive of FIG. 1.
Figure 8:
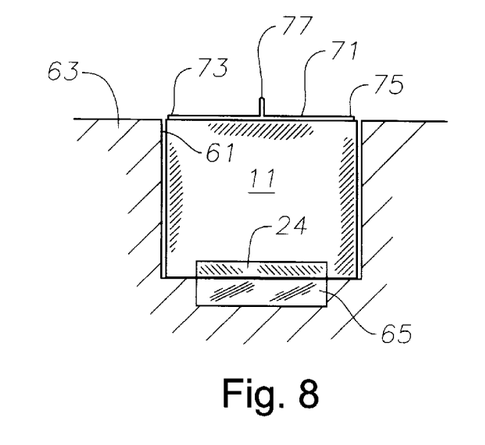
FIG. 8 is a schematic side view of the disk drive of FIG. 7 installed in a host system.

Referring now to FIGS. 7 and 8, microdrive 11 is equipped with a second embodiment of the present invention, mechanism 71. Like mechanism 41, mechanism 71 is mounted on one end of microdrive 11, opposite connector 24. mechanism 71 is an elastic one-piece band design that is preferably formed from a low cost elastomeric material with sufficient elasticity, stiffness, and strength to return mechanism 71 to-the stowed position (substantially flush with the end of microdrive 11) when it is not in use. Only the left and right ends 73, 75 of mechanism 71 are mounted to base 13, preferably with an adhesive bond. The length of mechanism 71 between ends 73, 75 is unattached and free to stretch and move relative to base 13. Mechanism 71 has a substantially flat rectangular profile with a small protrusion or rib 77 formed on one side near its center.

Figure 9:
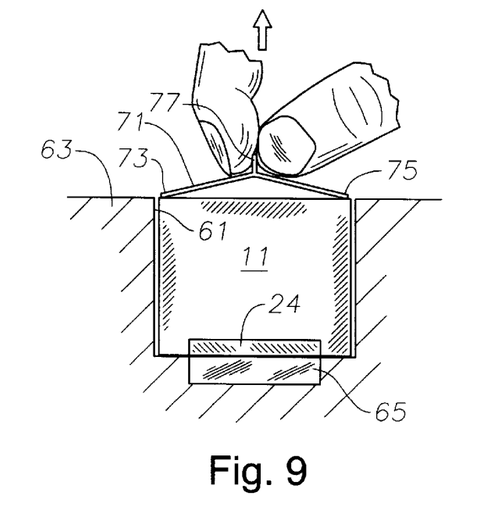
FIG. 9 is a schematic side view of the disk drive and host system of FIG. 8 shown with the disk drive at an initial stage of removal.
Figure 10:
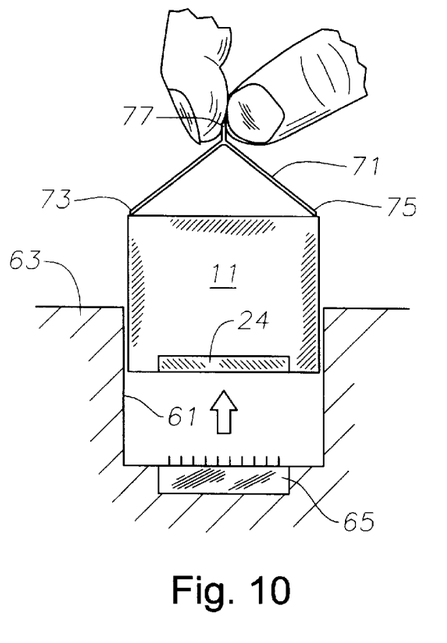
FIG. 10 is a schematic side view of the disk drive and host system of FIG. 8 shown with the disk drive at an advanced stage of removal.
Figure 11:
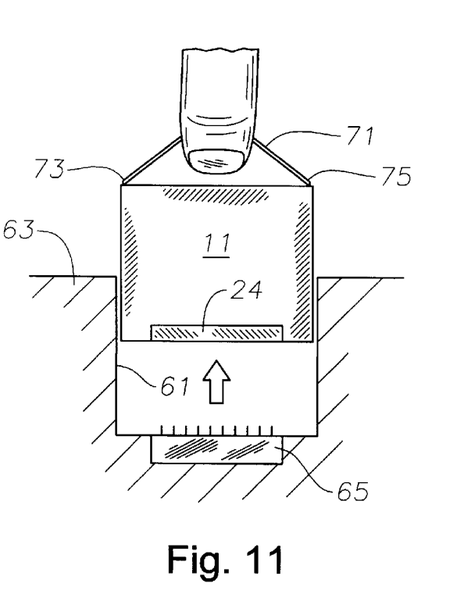
FIG. 11 is a schematic side view of the disk drive and host system of FIG. 10 at the advanced stage of removal and illustrating an alternate grip position on the release mechanism.

In operation (FIG. 8), microdrive 11 is installed in receptacle 61 in host system 63. Connector 65 of receptacle 61 is interconnected to connector 24 on microdrive 11. When not in use, mechanism 71 lies substantially flush with the exterior of microdrive 11 and host system 63 to maintain the form factor of microdrive 11 and a clean profile for host system 63. When microdrive 11 So is to be removed from host system 63 (FIG. 9), the user grasps rib 77 and stretches mechanism 71 away from host system 63. Again, this step may be coordinated with the actuation of an ejection button. In FIG. 10, the user continues to pull on the central rib 77 between ends 73, 75 for a smooth extraction of microdrive 11 from host system 63. FIG. 11 illustrates an alternate grip position on mechanism 71 wherein the user may extend his or her fingers through the opening between microdrive 11 and mechanism 71. The user maintains a grip on mechanism 71 at all times, thereby minimizing the risk of mishandling and dropping microdrive 11. After microdrive 11 is removed, the properties and design of mechanism 71 allows it to collapse back to its stowed position (FIGS. 7 and 8).

Figure 12:
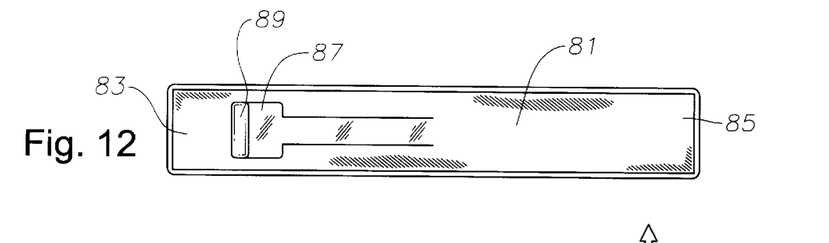
FIG. 12 is a schematic end view of a third embodiment of the release mechanism of FIG. 2 on the disk drive of FIG. 1.
Figure 13:
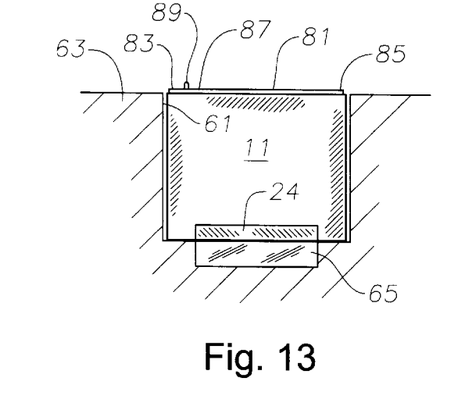
FIG. 13 is a schematic side view of the disk drive of FIG. 12 installed in a host system.

Referring now to FIGS. 12 and 13, mechanism 81 depicts a third embodiment of the invention. Like its predecessors, the ends 83, 85 of mechanism 81 are mounted to microdrive 11 opposite connector 24. Mechanism 81 is a single elastic band with a small protruding strap 87 integrally joined near its center. Thus, in a sense, mechanism 81 is a hybrid of the previous two embodiments. When not in use, mechanism 81 and strap 87 have a substantially flat profile with a small rib 89 on the free end of strap 87. Other than ends 83, 85, mechanism is unattached to microdrive 11 and free to stretch and move relative to base 13.

Figure 14:
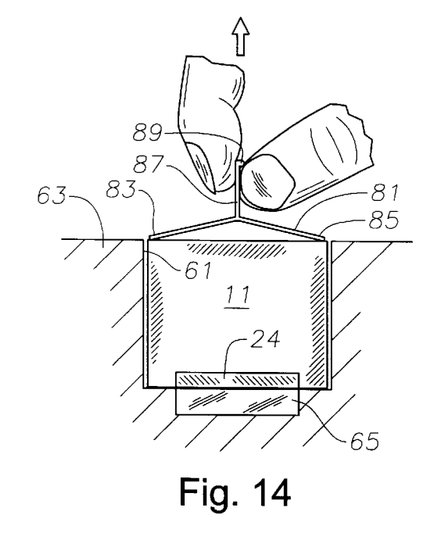
FIG. 14 is a schematic side view of the disk drive and host system of FIG. 13 shown with the disk drive at an initial stage of removal.
Figure 15:
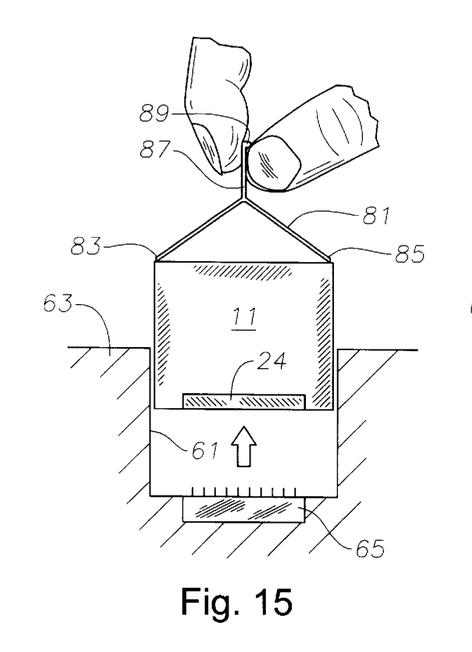
FIG. 15 is a schematic side view of the disk drive and host system of FIG. 13 shown with the disk drive at an advanced stage of removal.
Figure 16:
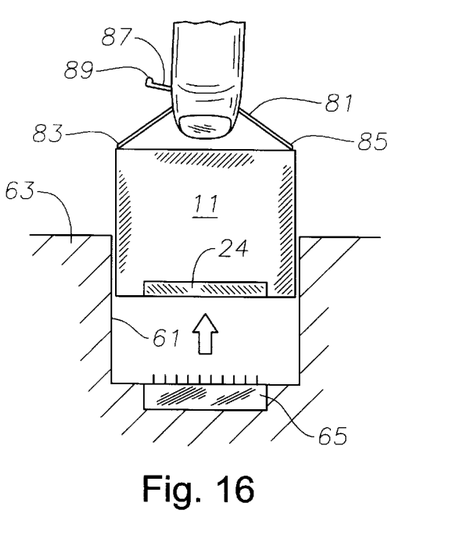
FIG. 16 is a schematic side view of the disk drive and host system of FIG. 15 at the advanced stage of removal and illustrating an alternate grip position on the release mechanism.

In operation (FIG. 13), microdrive 11 is installed in receptacle 61 in host system 63 with connector 24, 65 interconnected. When not in use, mechanism 81 lies substantially flush with the exterior of microdrive 11 and host system 63 to maintain the form factor of microdrive 11 and a clean profile for host system 63. When microdrive 11 is to be removed from host system 63 (FIG. 14), the user grasps rib 89 and pulls on strap 87 such that mechanism 81 stretches away from microdrive 11. In FIG. 15, the user continues to pull on strap 87 between ends 83, 85 for a smooth extraction of microdrive 11 from host system 63. FIG. 16 illustrates an alternate grip position on mechanism 81 wherein the user may extend his or her fingers through the opening between microdrive 11 and mechanism 81. The user maintains a grip on mechanism 81 at all times to minimize the risk of damage to microdrive 11. After microdrive 11 is removed, mechanism 81 collapses back to its stowed position (FIGS. 12 and 13).

Figure 17:
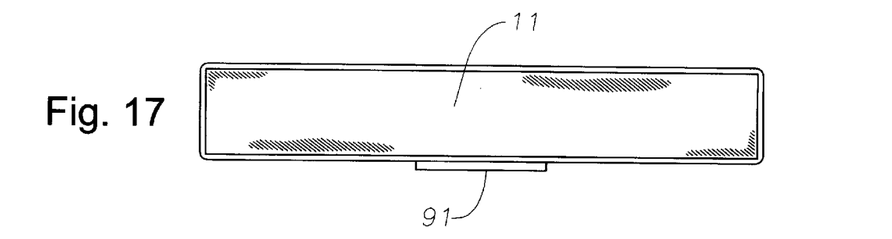
FIG. 17 is a schematic end view of a fourth embodiment of the release mechanism of FIG. 2 on the disk drive of FIG. 1.
Figure 18:
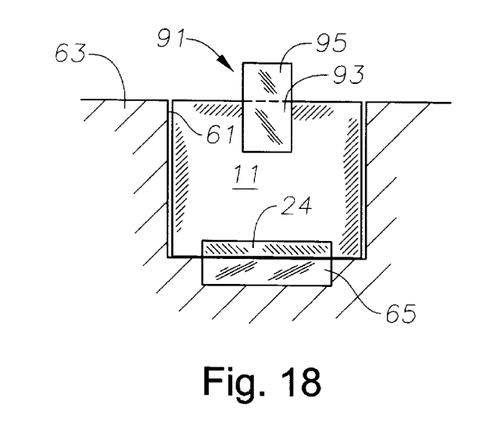
FIG. 18 is a schematic side view of the disk drive of FIG. 17 installed in a host system.

Referring now to FIGS. 17 and 18, mechanism 91 depicts a fourth embodiment of the invention. Mechanism 91 is a single, flexible, inelastic substrate having an adhesive portion 93 and a grip 95 that is free of adhesive. Unlike its predecessors, mechanism 91 is preferably mounted to one of the large outer surface areas of microdrive 11, although it could be mounted to the end as well. Adhesive portion 93 is securely bonded to base 13 and grip 95 extends away therefrom. Alternatively, mechanism 91 may have two adhesive portions 93 (one on each side of base 13) which join to form a single grip 95 (not shown).

Figure 19:
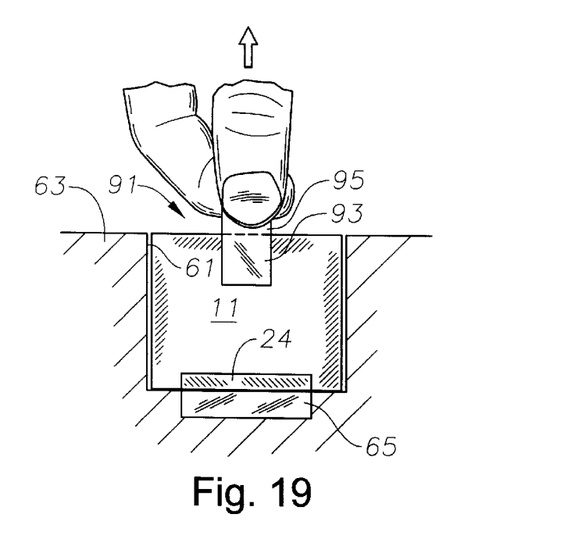
FIG. 19 is a schematic side view of the disk drive and host system of FIG. 18 shown with the disk drive at an initial stage of removal.
Figure 20:
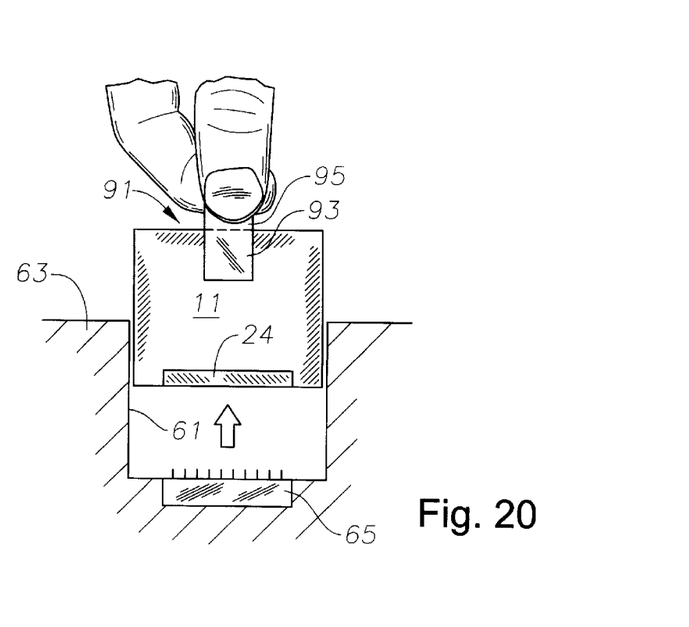
FIG. 20 is a schematic side view of the disk drive and host system of FIG. 18 shown with the disk drive at an advanced stage of removal.

In operation (FIG. 18), microdrive 11 is installed in receptacle 61 in host system 63 with connector 24, 65 interconnected. When not in use, mechanism 91 only marginally adds to maintain the form factor of microdrive 11 and profile of host system 63. When microdrive 11 is to be removed from host system 63 (FIGS. 19 and 20), the user grasps grip 95 and pulls such that mechanism 91 smoothly extracts microdrive 11. The user maintains a grip on mechanism 91 at all times to minimize the risk of damage to microdrive 11. After microdrive 11 is removed, mechanism 91 continues to extend from microdrive 11 (see FIG. 18).

The invention has several advantages including the ability to safely remove a microdrive from its host system without incurring the risk of mishandling the microdrive after automatic ejection from the system. The mechanism described above is designed for direct manual handling such that a firm hold is maintained on the microdrive at all times. The present invention is readily gripped by users and easily extendable during use. In the preferred embodiment, the mechanism stows neatly on the side edge when not in use. The mechanism does not violate the form factor of microdrives in any appreciable way as it conforms to a flat surface on the side edge of the microdrive.

While the invention has been shown or described in only some of its forms, it should be apparent to those skilled in the art that it is not so limited, but is susceptible to various changes without departing from the scope of the invention.

What is claimed is:

1. An ergonomic safety assist mechanism for removing a microdrive from a host system, the microdrive having a rotatable disk, a pivot actuator with an arm and a head for interacting with the disk, and a connector on one end for interconnection with the host system, the mechanism comprising:

a flexible strap having a strap stationary end that is adapted to be mounted to the microdrive opposite the connector, a strap free end opposite the strap stationary end, and a slot located between the strap stationary and free ends;

a flexible slide having a slide stationary end that is adapted to be mounted to the microdrive opposite the connector and adjacent to the strap, and a slide free end opposite the slide stationary end, wherein the slide extends through the slot in the strap; and wherein the mechanism has a stowed position wherein the strap and the slide are flush with the microdrive, and an extended position wherein the slide is adapted to be grasped by a user and slidably moved through the, slot for extracting the microdrive from the host system.

2. The ergonomic safety assist mechanism of claim 1 wherein the strap and the slide automatically return to the stowed position when the slide is released by the user.

3. The ergonomic safety assist mechanism of claim 1 wherein the strap and the slide are inelastic.

4. The ergonomic safety assist mechanism of claim 1 wherein the mechanism is adapted to disconnect the connector of the microdrive from the host system as it moves from the stowed position to the extended position.

5. The ergonomic safety assist mechanism of claim 1 wherein the slide is adapted to centrally align relative to the microdrive in the extended position such that the mechanism exerts a symmetric force on the microdrive.

* * * * *

UNITED STATES PATENT AND TRADEMARK OFFICE
CERTIFICATE OF CORRECTION

PATENT NO.     : 6,545,839 B2                                        Page 1 of 1
DATED          : April 8, 2003
INVENTOR(S)    : Smith It is certified that error appears in the above-identified patent and that said Letters Patent is hereby corrected as shown below:

<u>Title page, Item [54] and Column 1, lines 1 through 3,</u>
The title should read as follows:

-- ERGONOMIC SAFETY ASSIST MECHANISM FOR HANDLING MICRO-SIZED COMPUTER HARD DISK DRIVES --

<u>Column 2,</u>
Lines 4, 5 and 6, delete "removing microdrives from their host systems and minimizing the risk of damage to the microdrives as they are handled"

<u>Column 4,</u>
Line 5, please delete "EMU".
Line 20, please insert the word -- mechanism -- after the word "assist".

Signed and Sealed this

Ninth Day of September, 2003

JAMES E. ROGAN
*Director of the United States Patent and Trademark Office*